(12) United States Patent
Chuang et al.

(10) Patent No.: US 10,261,324 B2
(45) Date of Patent: Apr. 16, 2019

(54) REMOVABLE LENS ASSEMBLY FOR A HEAD-MOUNTED DISPLAY

(71) Applicant: Facebook Technologies, LLC, Menlo Park, CA (US)

(72) Inventors: Brian Lawrence Chuang, Seattle, WA (US); Mark Alan Tempel, Issaquah, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 15/674,284

(22) Filed: Aug. 10, 2017

(65) Prior Publication Data

US 2019/0056590 A1 Feb. 21, 2019

(51) Int. Cl.
*G02B 27/01* (2006.01)
*G02B 27/00* (2006.01)
*H04N 13/344* (2018.01)

(52) U.S. Cl.
CPC ..... *G02B 27/0172* (2013.01); *G02B 27/0025* (2013.01); *G02B 27/0176* (2013.01); *H04N 13/344* (2018.05); *G02B 2027/011* (2013.01); *G02B 2027/0132* (2013.01); *G02B 2027/0154* (2013.01)

(58) Field of Classification Search
CPC .......... G02B 7/02; G02B 7/021; G02B 7/022; G02B 7/025; G02B 7/026
USPC .......................................... 359/819–824, 630
See application file for complete search history.

(56) References Cited

U.S. PATENT DOCUMENTS

| 9,472,025 | B2 | 10/2016 | Thomas | |
| 9,671,612 | B2 | 6/2017 | Kress et al. | |
| 2002/0196554 | A1* | 12/2002 | Cobb | G02B 27/0172 |
| | | | | 359/633 |
| 2012/0249797 | A1* | 10/2012 | Haddick | G06F 1/163 |
| | | | | 348/158 |
| 2016/0187654 | A1* | 6/2016 | Border | G02B 5/04 |
| | | | | 359/567 |

FOREIGN PATENT DOCUMENTS

| CN | 103784298 A | 5/2014 |
| CN | 204101817 U | 1/2015 |
| KR | 10-2016-0136674 A | 11/2016 |

OTHER PUBLICATIONS

PCT International Search Report and Written Opinion, PCT Application No. PCT/US2018/045658, Dec. 7, 2018, 14 pages.

* cited by examiner

*Primary Examiner* — Mohammed A Hasan
(74) *Attorney, Agent, or Firm* — Fenwick & West LLP

(57) ABSTRACT

A lens assembly can be removably attached to an eye cone of a HMD. The eye cone displays images to an eye of a user of the HMD. The eye cone includes a peripheral wall that extends towards rear of the HMD. The lens assembly includes a corrective lens and a frame. The corrective lens corrects a vision error of the eye of the user. The frame includes an inner surface onto which the corrective lens is attached. The frame also includes a wall that receives a peripheral wall of the eye cone for removably securing the lens assembly to the HMD. The HMD can include another eye cone that displays images to the other eye of the user. Another lens assembly can be removably attached to the other eye cone.

17 Claims, 6 Drawing Sheets

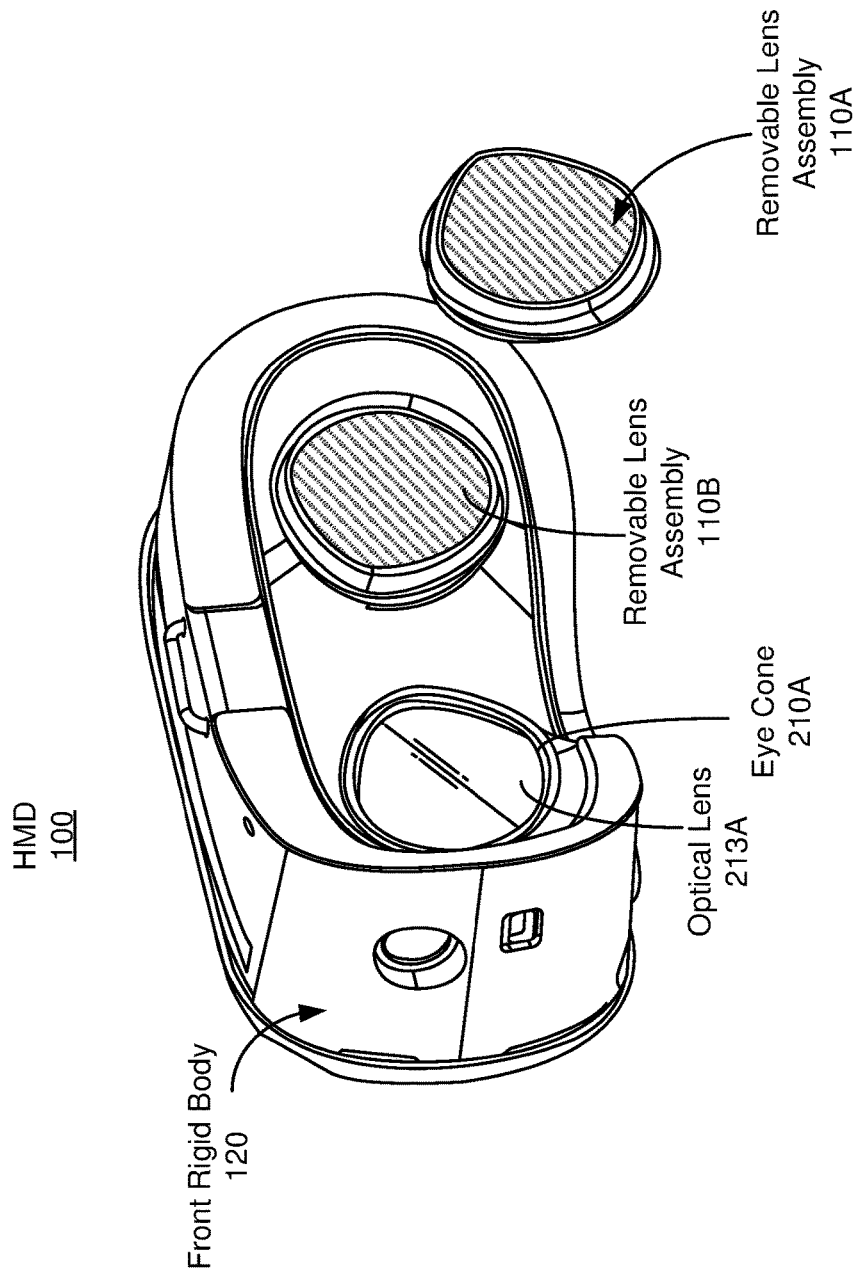

REMOVABLE LENS ASSEMBLY FOR A HEAD-MOUNTED DISPLAY

BACKGROUND

The present disclosure generally relates to head-mounted displays (HMD), and specifically to a lens assembly that can be removably inserted into HMD.

Use of HMD for virtual reality (VR) or augmented reality (AR) applications has become more commonplace. However, many users of HMD have vision errors and currently available HMD do not accommodate need of wearing prescription glasses for those users. Some users choose to wear contacts while using HMD, which impairs user experience with HMD. Some users choose to wear their prescription glasses inside HMD. But HMD do not always have enough space for the users' prescription glasses. It is possible to design HMD to have enough space between the front assembly of the HMD and the user's face to accommodate users wearing prescription glasses. However, such a design would increase the size of the HMD and can impair experience of users who do need to wear prescription glasses.

SUMMARY

Embodiments relate to a removable lens assembly for correcting one or more vision errors of a user of a HMD. The removable lens assembly can be removably attached to the corresponding eye cone of the HMD. For example, the removable lens assembly can be attached on the eye cone when vision error correction is needed and detached from the eye cone when vision error correction is not needed or to use a different prescription lens.

In some embodiments, the removable lens assembly includes a corrective lens and a frame. The corrective lens corrects one or more vision errors of the user's eye. In some embodiments, the corrective lens is a prescription lens prescribed by an ophthalmologist or an optometrist. The corrective lens can be attached onto the frame. The frame includes a wall at a front portion of the frame to which a peripheral wall of the eye cone is removably attached.

The HMD can have two eye cones for both eyes of the user, each of which receives a separate removable lens assembly. In some embodiments, the two eye cones are symmetric. Corrective lenses of the two removable lens assemblies can be different to correct different vision errors of the two eyes of the user.

BRIEF DESCRIPTION OF THE DRAWINGS

FIG. 2 is another perspective view of the HMD illustrating one of the removable lens assemblies detached from the HMD, in accordance with an embodiment.

The figures depict embodiments of the present disclosure for purposes of illustration only.

DETAILED DESCRIPTION

Embodiments relate to a removable lens assembly for use in a head-mounted display (HMD). The removable lens assembly includes a corrective lens and a frame. The corrective lens corrects vision error of an eye of a user of the HMD. The corrective lens can be attached at one side of the frame. The removable lens assembly can be removably attached to an eye cone of a HMD through one or more protrusions of the frame and one or more notches of the eye cone.

Figure 1:
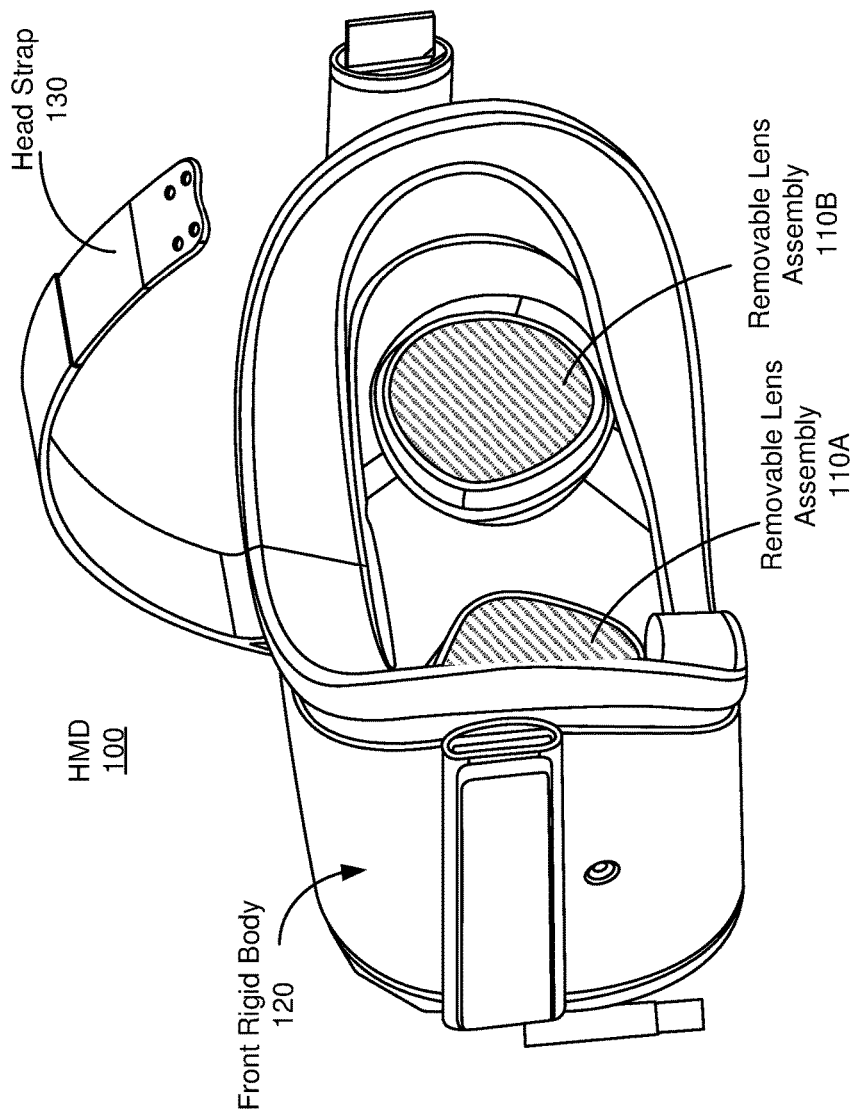
FIG. 1 is a perspective view of a HMD including a pair of removable lens assemblies, in accordance with an embodiment.

FIG. 1 is a perspective view of a HMD 100 including a pair of removable lens assemblies 110A and 110B, in accordance with an embodiment. In the embodiment of FIG. 1, the HMD 100 further includes a front rigid body 120 and a head strap 130. The head strap 130, in some embodiments, has adjustable length. Between the front rigid body 120 and the head strap 130 of the HMD 100, there is sufficient space allowing a user to mount the HMD 100 onto the user's head. In other embodiments, the HMD 100 may include additional, fewer, or different components. For example, the HMD 100 includes eyeglasses temples and temples tips, instead of the head strap 130.

The HMD 100 is a head-mounted display that presents media to a user comprising virtual and/or augmented views of a physical, real-world environment with computer-generated elements. Examples of the media presented by the HMD 100 include images (e.g., 2D or 3D images), video (e.g., 2D or 3D video), audio, or some combination thereof. Images and video can be presented to each of the eyes of the user by using electronic displays enclosed in the front rigid body 120 of the HMD 100.

The HMD 100 may be part of, e.g., a VR system, an AR system, a MR (mixed reality) system, or some combination thereof. In embodiments that describe AR system and/or a MR system, portions of the HMD 100 that are between a front side of the HMD 100 and an eye of the user are at least partially transparent (e.g., a partially transparent electronic display).

The HMD 100 has two eye cones 210 (shown in FIG. 2), one for directing images generated by the front rigid body 120 to the user's left eye, and the other for directing images by the front rigid body 120 to the user's right eye. An eye cone 210 includes an optical lens 213 (shown in FIG. 2). The optical lens 213 is an optical element, such as an aperture, a Fresnel lens, a convex lens, a concave lens, a filter, or any other suitable optical element that affects the image light emitted from the electronic display. Moreover, the optical lens 213 may include combinations of different optical elements. In some embodiments, one or more of the optical elements in the optical lens 213 may have one or more coatings, such as partial reflectors or anti-reflective coatings.

The optical lens 213 can magnify light received from the corresponding electronic display. Magnification of the image light by the optical lens 213 allows the electronic display of the HMD 100 to be physically smaller, weigh less, and consume less power than larger displays. Additionally, magnification may increase a field of view of the displayed media. For example, the field of view of the displayed media is such that the displayed media is presented to cover almost the entire (e.g., 110° diagonal), and in some cases, entire instantaneous field of the user's view. In some embodiments, the effective focal length the optical lens 213 is larger than the spacing to the electronic display. Consequently, the optical lens 213 magnifies the image light projected by the electronic display. Additionally, in some embodiments, the amount of magnification may be adjusted by adding or removing optical elements.

The optical lens 213 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display for display is pre-distorted, and the optical lens corrects the distortion when it receives image light from the electronic display generated based on the content. In some embodiments, the eye cone 210 also includes a ring on a surface to engage the optical lens 213 with the eye cone 210. The ring is adhesive. Both the ring and the optical lens 213 can be permanently attached on the eye cone 210.

The removable lens assemblies 110 can be removably attached to the eye cones 210 of the HMD 100 using a mechanical mechanism including, for example, protrusions and notches. For example, a removable lens assembly 100 is attached on a corresponding eye cone 210 when the protrusions snap into the notches. Also, the removable lens assembly 110 can be detached from the eye cone by pulling the removable lens assembly 110 from the eye cone 210.

The removable lens assemblies 110 presents corrected image to corresponding eye of the user. A removable lens assembly 110 includes a corrective lens that corrects refractive errors in the eye of the user. The corrective lens can also prevent dusts or moisture from contaminating a surface of the corresponding optical lens.

The removable lens assembly 110 further includes a frame that holds the corrective lens, as described below in detail with reference to FIG. 4. The corrective lenses of the two removable lens assemblies 110 can have different configurations, e.g., due to different refractive errors of the two eyes of the user or for a purpose of creating three-dimensional effects. More details about those components of the removable lens assembly 110 are described in conjunction with FIG. 4.

FIG. 2 is another perspective view of the HMD 100 illustrating one of the removable lens assemblies 110 detached from the HMD 100, in accordance with an embodiment. Various components including the head strap 130 are not shown in FIG. 2 to facilitate understanding. As shown in FIG. 2, the removable lens assembly 110A is detached from its corresponding eye cone 210A. Accordingly, the optical lens 213A is visible. In some embodiments, a component of the HMD 100 behind the optical lens 213A is an electronic display for the left eye of the user of the HMD 100.

Figure 3A:
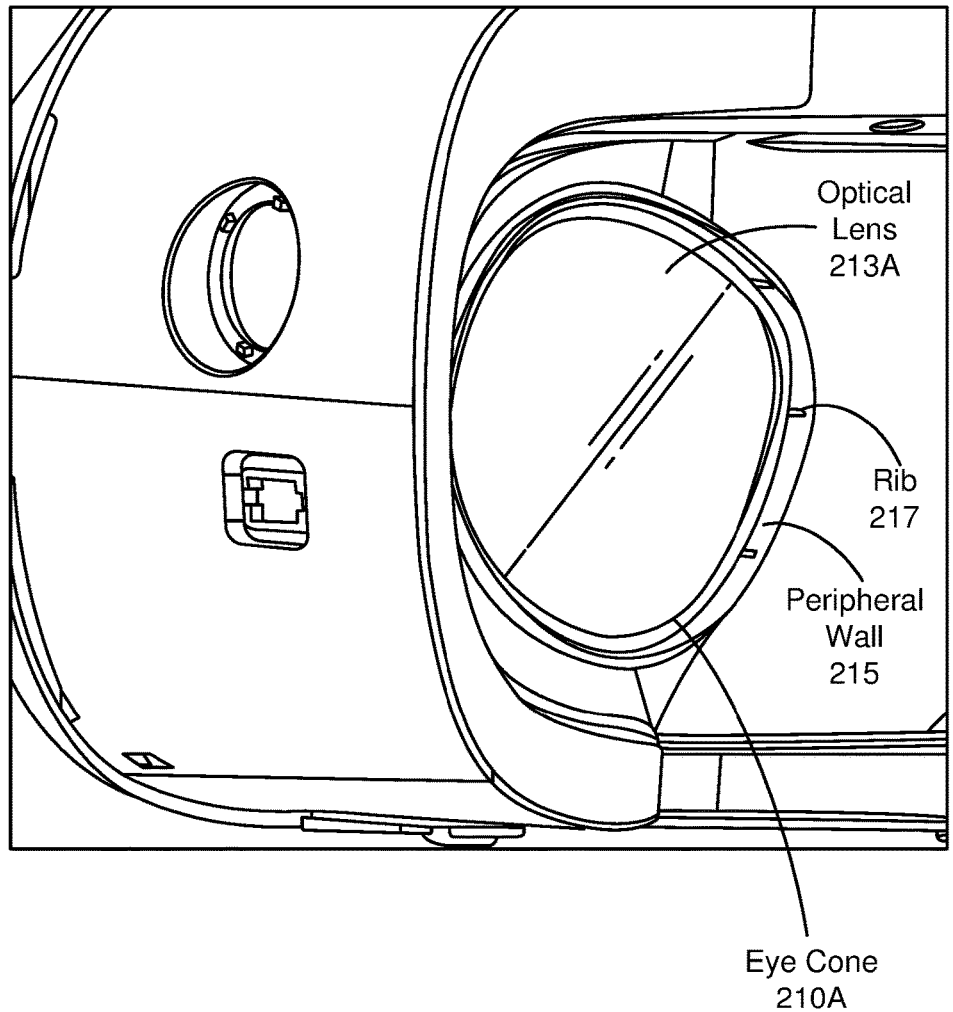
FIG. 3A is a perspective view illustrating a portion of the HMD including an eye cone, in accordance with an embodiment.

FIG. 3A is a perspective view illustrating a portion of the HMD 100 including an eye cone 210A, in accordance with an embodiment. The eye cone 210A is for the left eye of a user of the HMD 100 and can receive the removable lens assembly 110A. Although not shown in FIG. 3A, the HMD 100 includes another eye cone 210B for the right eye of a user of the HMD 100 and receiving the removable lens assembly 110B. In one embodiment, the eye cone 210B may be symmetric to the eye cone 210A but different in shape so that the removable lens assembly for one eye cone would not fit onto the other eye cone.

The eye cone 210A includes the optical lens 213A and a peripheral wall 215 that has a plurality of ribs 217 to provide rigidity and strength. Even though FIG. 3A shows three ribs 217 on the right side of the peripheral wall 215, the eye cone 210A can have more ribs 217, e.g., on the left side of the peripheral wall 215.

Figure 3B:
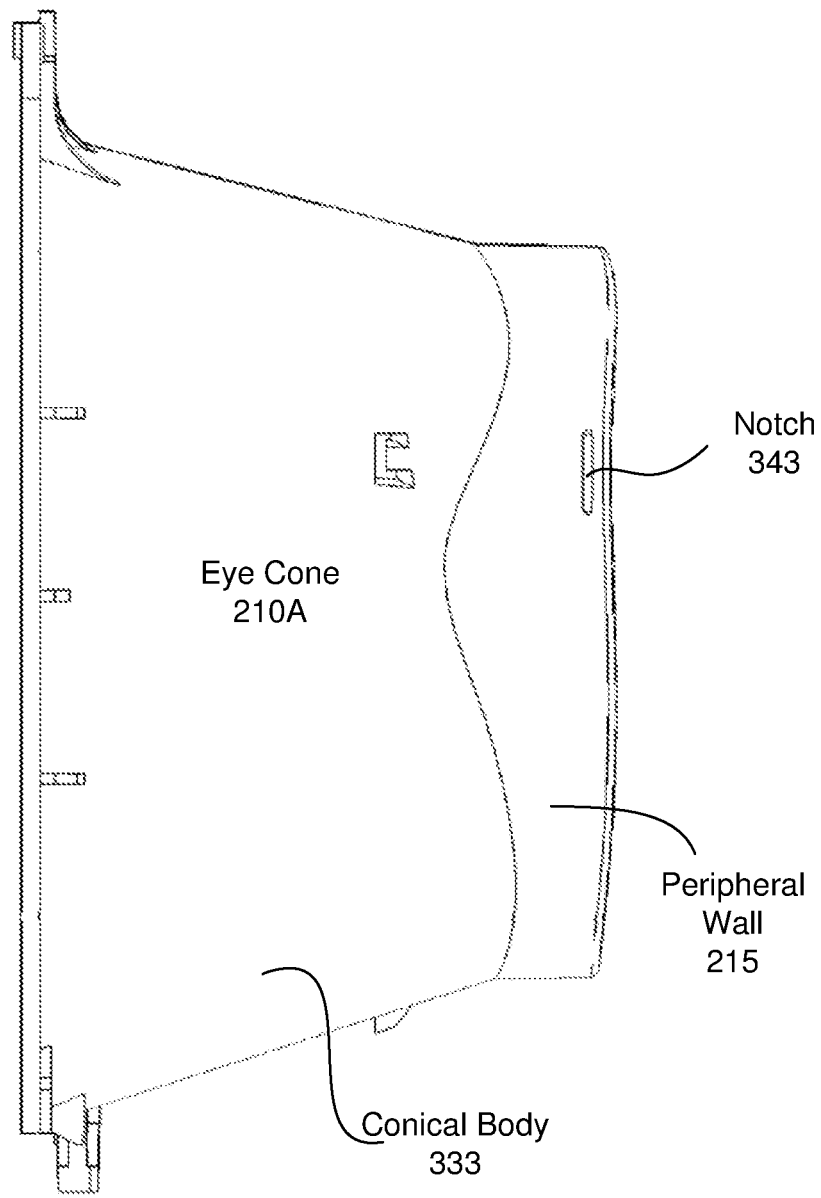
FIG. 3B is a side view of the eye cone, in accordance with an embodiment.

FIG. 3B is a side view of the eye cone 210A, in accordance with one embodiment. The eye cone 210A has a conical body 333 from which the peripheral wall 215 extends. On the outer surfaces of the peripheral wall 215, at least one notch 343 is formed to secure the removable lens assembly 110A to the eye cone 210A. Although only one notch 343 is shown in FIG. 3B, a plurality of notches 343 may be formed around the peripheral wall 215. One or more protrusions 510 (shown in FIG. 5) formed on the inner surface of the removable lens assembly 110A snap into the one or more notches 343 to secure the removable lens assembly 110A onto the eye cone 210A. The user may push or pull the removable lens assembly 110A towards or from the eye cone 210A to attach or detach the removable lens assembly 110A to or from the eye cone 210A.

Figure 4:
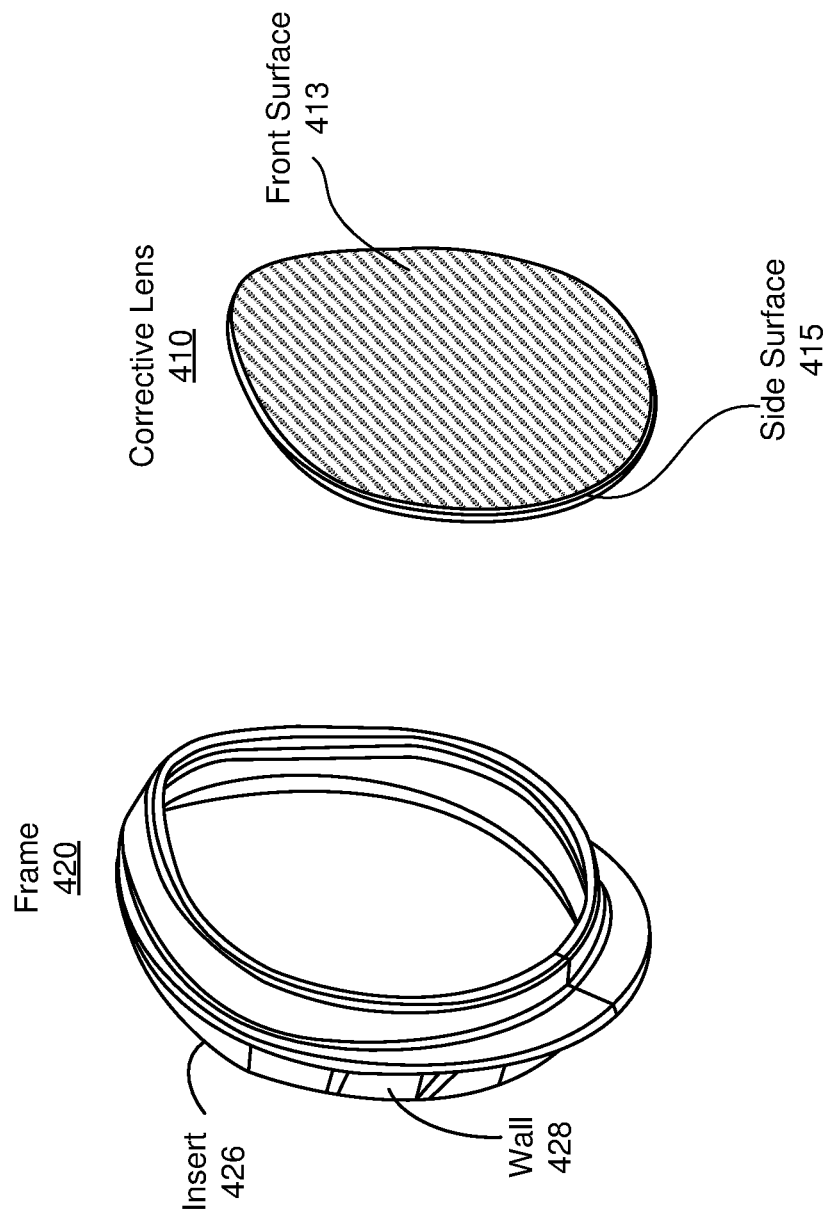
FIG. 4 is an explode view illustrating components of a removable lens assembly, in accordance with an embodiment.

FIG. 4 is an exploded view illustrating components of a removable lens assembly 110, in accordance with an embodiment. As shown in FIG. 4, the removable lens assembly 110 includes a corrective lens 410 and a frame 420.

The corrective lens 410 corrects refractive errors in vision of an eye of a user of the HMD 100. For example, the corrective lens 410 is prescribed by an ophthalmologist or an optometrist and has a power determined by the ophthalmologist or optometrist. The corrective lens 410 can treat myopia, hyperopia, astigmatism, presbyopia, other types of errors in vision, or any combination thereof. Examples of the corrective lens 410 include single vision lens, bifocal lens, trifocal lens, varifocal lens, etc. The corrective lens 410 has a front surface 413, a rear surface 517, (shown in FIG. 5B) and a side surface 415 connecting the front surface 413 and the rear surfaces.

The corrective lens 410 also prevents dusts or moisture from contaminating the inner surface of the optical lens 213. The corrective lens 410 may also perform additional optical function such as polarizing, magnifying or refracting of the light. In some embodiments, one or more of the optical elements in the corrective lens 410 may have one or more coatings, such as partial reflectors or anti-reflective coatings. The corrective lens 410 may also correct one or more types of optical error.

The frame 420 holds the corrective lens 410 at its front portion. In the embodiment of FIG. 4, when the removable lens assembly 110 is attached on the corresponding eye cone 210 of the HMD 100, the corrective lens 410 is closer from the user's eye and the optical lens 213 of the eye cone 210 is further to the user's eye. In some alternative embodiment, the corrective lens 410 can be further to the user's eye but the optical lens 213 can be closer from the user's eye.

The frame 420 further includes a wall 428 at its front portion surrounding the frame 420. The peripheral wall 215 of the eye cone 210 is inserted through the inner surface of the wall 428. The inner surface of the wall 428 is formed with one or more protrusions 510 (shown in FIGS. 5A and 5B) that snap into the one or more notches 343 formed on the surface of the peripheral wall 215. The combination of the notches 343 and protrusions 510 locks the removable lens assembly 110 onto the eye cone 210. But the removable lens assembly 110 can be detached from the eye cone 210 by pulling the frame 420 out from the eye cone 210 with sufficient force.

Figure 5B:
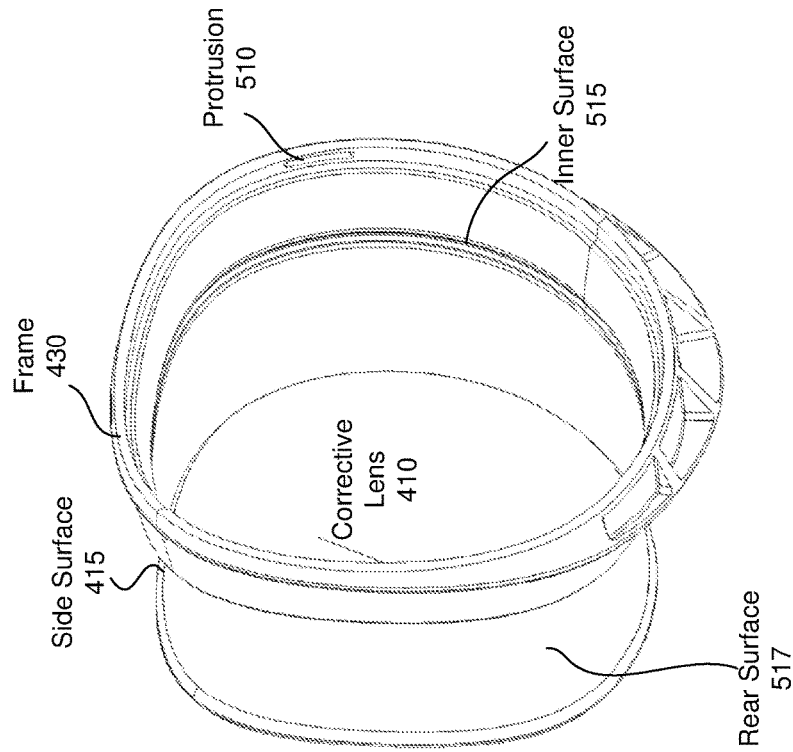
FIG. 5B is an exploded view of the removable lens assembly with a corrective lens removed from a frame, in accordance with an embodiment.
Figure 5A:
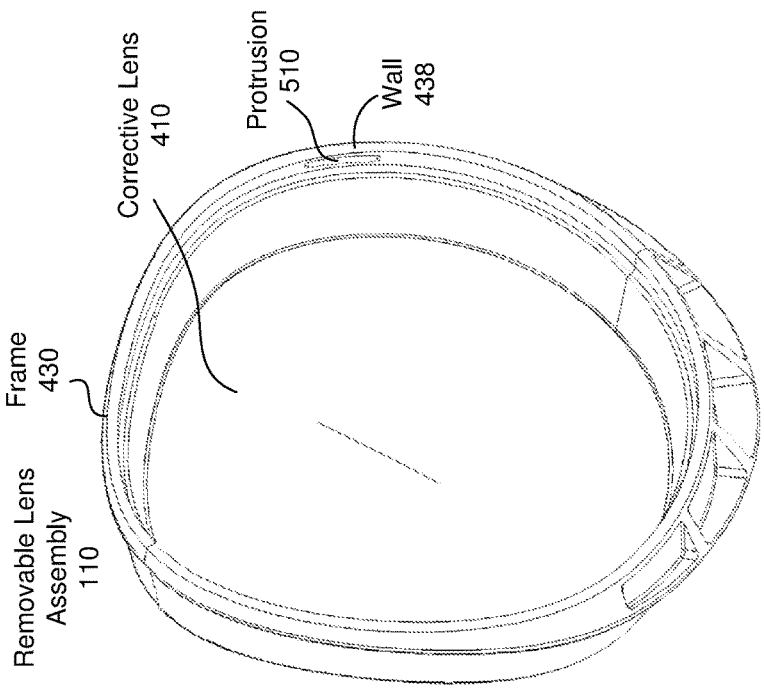
FIG. 5A is a rear perspective view of the removable lens assembly, according to an embodiment.

FIG. 5A is a rear perspective view of the removable lens assembly 110, according to one embodiment. The peripheral wall 215 of the eye cone 210 is inserted into inner surface of wall 428 so that the protrusions 510 protruding from the inner surface of the wall 428 snap into the notches 343 formed on the outer surface of the peripheral wall 215. In other embodiments, the peripheral wall 215 of the eye cone 210 may be formed with the protrusions whereas the removable lens assembly 110 is formed with notches.

FIG. 5B is an exploded view of the removable lens assembly 110 with the corrective lens 410 removed from the frame 420, in accordance with an embodiment. The side surface 415 of the corrective lens 410 is secured to an inner surface 515 of the frame 420. The corrective lens 410 can be secured to the frame 420, for example, by adhesive. However, other securing mechanism such as screws or latches may also be used to secure the corrective lens 410 to the frame 420.

The foregoing description of the embodiments of the disclosure has been presented for the purpose of illustration; it is not intended to be exhaustive or to limit the disclosure to the precise forms disclosed.

What is claimed is:

1. A lens assembly comprising:
a corrective lens customized to correct a vision error of an eye of a user of a head-mounted display (HMD), the corrective lens comprising:
a front surface,
a rear surface, and
a side surface connecting the front surface and the rear surface; and
a frame configured to attach to a body of the HMD, the frame comprising:
an inner surface onto which the corrective lens is attached, and
a wall extending at a front portion of the frame and configured to receive a peripheral wall at a rear side of the body of the HMD for removably securing the lens assembly to the body of the HMD.

2. The lens assembly of claim 1, wherein the wall comprises a plurality of protrusions that are received in a plurality of notches in the peripheral wall.

3. The lens assembly of claim 2, wherein the peripheral wall is part of an eye cone attached to a display device of the HMD.

4. The lens assembly of claim 3, wherein the eye cone includes an optical lens.

5. The lens assembly of claim 4, wherein when the lens assembly is secured to the body of the HMD, the corrective lens is located further away from the eye of the user compared to the optical lens of the eye cone.

6. The lens assembly of claim 1, wherein the corrective lens is secured to the frame.

7. The lens assembly of claim 6, wherein the corrective lens is secured to the frame by adhesive.

8. The lens assembly of claim 4, wherein the corrective lens is further configured to prevent contamination of the front surface of the optical lens of the eye cone.

9. A head-mounted display (HMD) comprising:
an eye cone configured to display images to one of a user's eyes, the eye cone comprising a peripheral wall extending towards rear of the HMD; and
a lens assembly removably attached to the peripheral wall, the left lens assembly comprising:
a corrective lens customized to correct a vision error of the one of the user's eyes, the corrective lens comprising:
a front surface,
a rear surface, and
a side surface connecting the front surface and the rear surface; and
a frame configured to attach the peripheral wall, the frame comprising:
an inner surface onto which the corrective lens is attached, and
a wall extending at a front portion of the frame and configured to receive a peripheral wall at a rear side of the body of the HMD for removably securing the lens assembly to the body of the HMD.

10. The HMD of claim 9, further comprising:
another eye cone configured to display images to another of the user's eyes, the eye cone comprising another peripheral wall extending towards rear of the HMD, wherein the lens assembly is shaped to receive the peripheral wall of the eye cone but not the other peripheral wall of the other eye cone.

11. The HMD of claim 10, further comprising:
another lens assembly removable attached to the other peripheral wall of the other eye cone.

12. The HMD of claim 9, wherein the wall of the frame comprises a plurality of protrusions that are received in a plurality of notches in the peripheral wall of the eye cone.

13. The HMD of claim 9, wherein the eye cone includes an optical lens.

14. The HMD of claim 13, wherein when the lens assembly is secured to the body of the HMD, the corrective lens is located further away from the eye of the user compared to the optical lens of the eye cone.

15. The HMD of claim 9, wherein the corrective lens is secured to the frame.

16. The HMD of claim 9, wherein the corrective lens is attached to the frame by adhesive.

17. The HMD of claim 9, wherein the corrective lens is further configured to prevent contamination of the front surface of the optical lens.

* * * * *